US012208504B2

(12) United States Patent
Lin

(10) Patent No.: US 12,208,504 B2
(45) Date of Patent: Jan. 28, 2025

(54) HAND TOOL WITH ROTARY HANDLE

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 318 days.

(21) Appl. No.: 17/741,010

(22) Filed: May 10, 2022

(65) Prior Publication Data

US 2023/0364773 A1 Nov. 16, 2023

(51) Int. Cl.
*B25G 1/06* (2006.01)

(52) U.S. Cl.
CPC .................................... *B25G 1/066* (2013.01)

(58) Field of Classification Search
CPC .......... B25G 1/063; B25G 1/066; B25G 1/06; B25G 1/04; B25B 23/1427; B25B 15/04
See application file for complete search history.

(56) References Cited

U.S. PATENT DOCUMENTS

| | | | | |
|---|---|---|---|---|
| 7,328,635 B2 | 2/2008 | Hu | | |
| 7,434,496 B2 | 10/2008 | Hu | | |
| 8,397,607 B2 * | 3/2013 | Huang | B25G 1/066 | 81/177.8 |
| 8,402,865 B2 * | 3/2013 | Lin | B25G 1/066 | 81/177.8 |
| 8,826,782 B2 * | 9/2014 | Chen | B25G 1/085 | 81/177.4 |
| 9,259,258 B2 * | 2/2016 | Laurenti | A61B 17/8875 | |
| 9,421,674 B2 * | 8/2016 | Chu | B25G 1/085 | |
| 10,343,295 B2 * | 7/2019 | Feuerstein | B26B 17/02 | |
| 11,090,822 B2 * | 8/2021 | Feuerstein | B25G 1/043 | |
| 2015/0283682 A1 * | 10/2015 | Chu | B25G 1/066 | 81/60 |

(Continued)

FOREIGN PATENT DOCUMENTS

| | | | |
|---|---|---|---|
| CN | 107378872 A * | 11/2017 | B25G 1/066 |
| CN | 107457749 A * | 12/2017 | B25G 1/06 |
| DE | 202010005335 U1 * | 9/2010 | B25G 1/063 |

(Continued)

OTHER PUBLICATIONS

Office Action date Aug. 30, 2022 of the corresponding Taiwan patent application No. 111112523.

*Primary Examiner* — David B. Thomas
(74) *Attorney, Agent, or Firm* — Chun-Ming Shih; HDLS IPR SERVICES

(57) ABSTRACT

A hand tool includes a first and a second handles, a rotating locking set, a fastening set, and a spring. The first and second handles include chamfered planes respectively. The rotating locking set includes a rotating block and a locking block. The fastening set includes a stud and a nut. The spring is mounted around the stud and elastically abuts against the rotating block. The first handle or the second handle drives the rotating block to disengage from the locking block when being pulled by an external force. The first handle and the rotating block rotate with respect to the second handle by the stud as the center point. The rotating block and the locking block are locked with each other after rotating a specific angle, so as to position the first handle and the second handle.

10 Claims, 7 Drawing Sheets

(56) References Cited

U.S. PATENT DOCUMENTS

| | | | | | |
|---|---|---|---|---|---|
| 2021/0339411 | A1* | 11/2021 | Feuerstein | .............. | B26B 17/02 |

FOREIGN PATENT DOCUMENTS

| | | | | | | |
|---|---|---|---|---|---|---|
| DE | 202014103221 | U1 | * | 12/2014 | ............. | B25B 23/16 |
| DE | 102015116138 | A1 | * | 3/2017 | ............. | B25G 1/066 |
| FR | 2991217 | A1 | * | 12/2013 | ............. | B25B 15/04 |
| FR | 2991218 | A1 | * | 12/2013 | ............. | B25B 15/04 |
| TW | M453563 | U | | 5/2013 | | |
| TW | I419776 | B | | 12/2013 | | |
| WO | WO-2017100567 | A1 | * | 6/2017 | ............... | B25G 1/04 |

* cited by examiner

HAND TOOL WITH ROTARY HANDLE

BACKGROUND OF THE DISCLOSURE

Technical Field

The technical field relates to a hand tool, and more particularly relates to a hand tool with a rotary handle.

Description of Related Art

Generally, hand tools are mostly used in a fixed direction, for example, a flat-blade screwdriver or a right-angle ratcheting screwdriver (90 degrees), etc. Additionally, the fixed angle hand tool is applied in a specific direction. However, when the hand tool needs to change the direction in use or is applied in a constrained space, then the hand tool being used has to be replaced, and that results in inconvenience of use.

Furthermore, there are hand tools with a rotary handle on the market, in which the handle includes two grips that may rotate relative to each other, and the angle between two grips may be changed by pushing the push button. However, when using such a hand tool with a rotary handle, users often touch or push the push button accidentally during the operation. Thus, the handle may be rotated unexpectedly which results in instability in use and safety issues.

In view of the above drawbacks, the inventor proposes this disclosure based on his expert knowledge and elaborate researches in order to solve the problems of related art.

SUMMARY OF THE DISCLOSURE

One object of this disclosure is to provide a hand tool with a rotary handle to prevent the user from activating the rotation of the first and second handles during the operation process to improve the stability and safety of use.

In the embodiment of this disclosure, a hand tool with a rotary handle includes a first handle, a second handle, a rotating locking set, a fastening set, and a spring. The first handle includes a first body and a first accommodating slot. The first body includes a first slanted plane disposed on one end. The second handle is movably combined with the first handle. The second handle includes a second body and a second accommodating slot. The second body includes a second slanted plane attached to the first slanted plane correspondingly and disposed on one end. The rotating locking set includes a rotating block and a locking block. The rotating block is arranged in the first accommodating slot, and the locking block is arranged in the second accommodating slot. The fastening set includes a stud and a nut. The stud passes through the locking block and the rotating block. One end of the stud is fixed in the first accommodating slot and the other end is fastened with the nut and inserted in the second accommodating slot. The spring is mounted around the stud and elastically abuts against the rotating block. The locking block and the rotating block are engaged with each other when the spring is compressed and are disengaged from each other when the spring is stretched. The first handle or the second handle drives the rotating block to disengage from the locking block when being pulled by an external force. The first handle and the rotating block rotate with respect to the second handle by the stud as the center point. The rotating block and the locking block are locked with each other after rotating a specific angle, so as to position the first handle and the second handle.

In comparison with the related art, the hand tool with a rotary handle in this disclosure includes the first and second handles provided with slanted planes respectively, and the rotating locking set is disposed between the first and second handles. Additionally, the stud passes through the rotating locking set, and the spring is mounted around the stud and elastically abuts against the rotating locking set. Accordingly, under an external force, the rotating locking set is engaged to position the first and second handles. Therefore, it is not necessary to arrange the push button in the related art to change the angle of the handle, so that the user may be prevented from touching or pushing the push button accidentally to change the angle of the handle during operation, so as to enhance the stability and safety of use.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
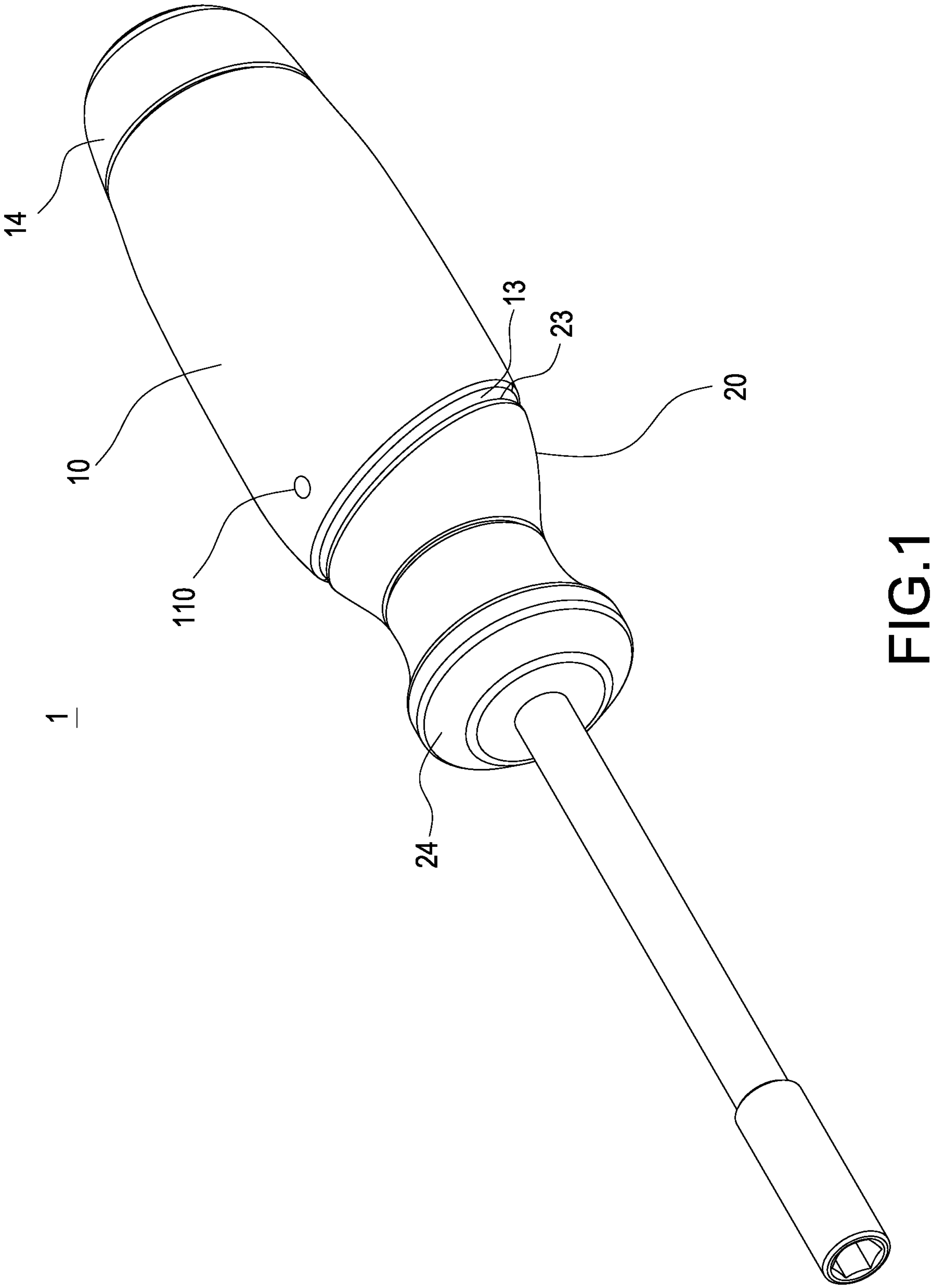
FIG. 1 is a perspective schematic view of the hand tool with a rotary handle in this disclosure.
Figure 2:
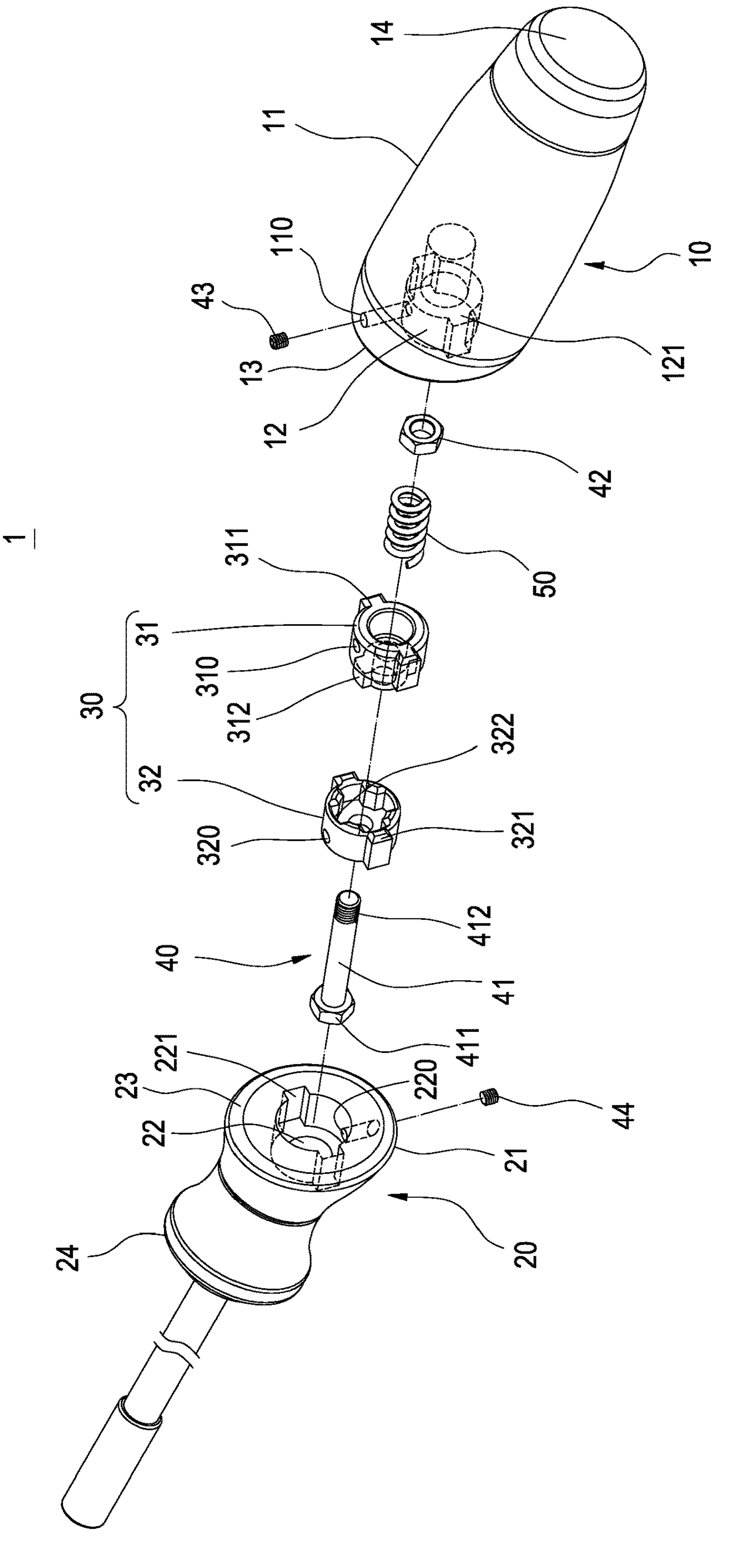
FIG. 2 is a perspective exploded view of the hand tool with a rotary handle in this disclosure.
Figure 3:
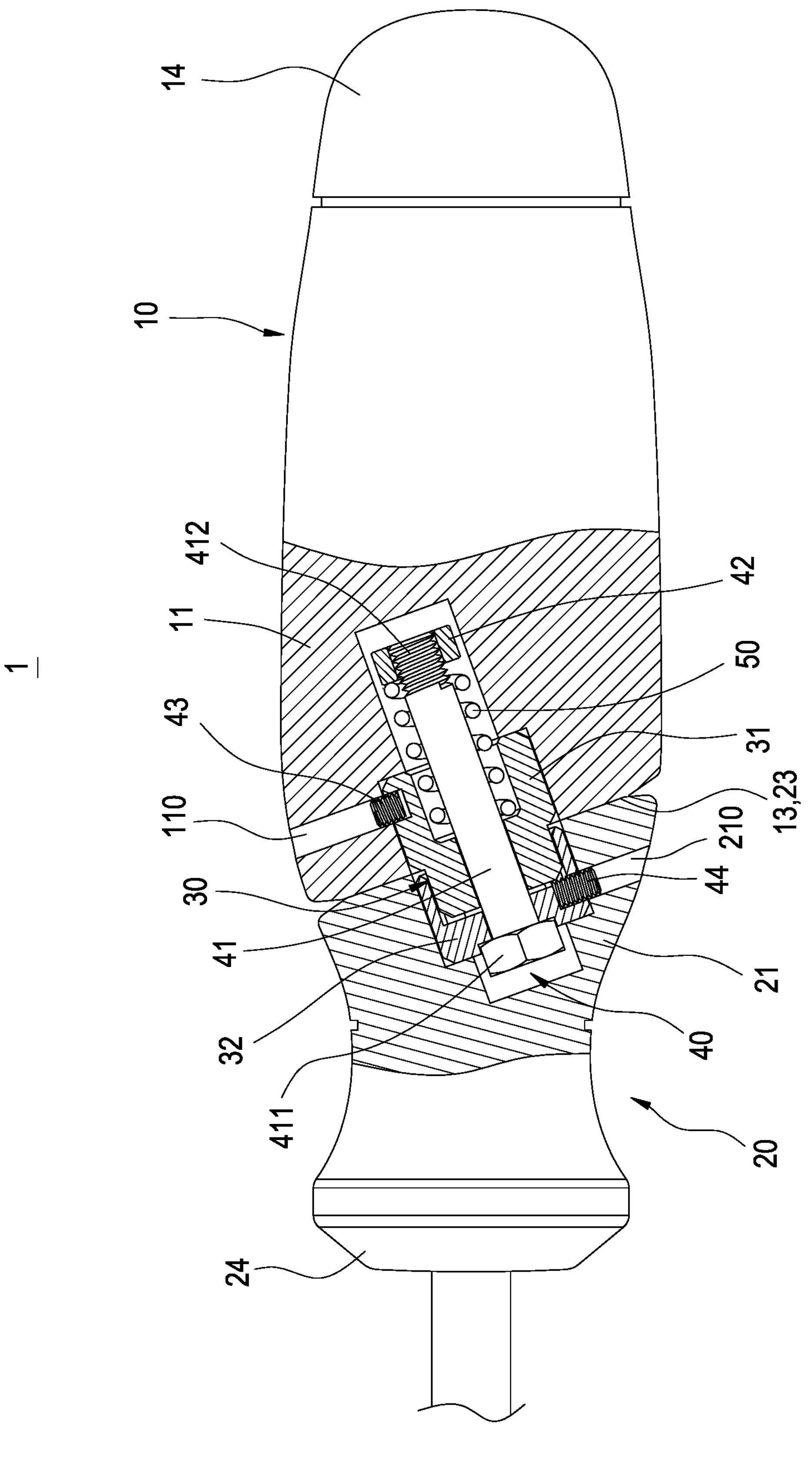
FIG. 3 is a cross sectional view of the hand tool with a rotary handle in this disclosure.

Please refer to FIG. 1 to FIG. 3, which depict a perspective schematic view, a perspective exploded view and a cross sectional view of the hand tool with a rotary handle in this disclosure. The hand tool 1 with a rotary handle of this disclosure includes a first handle 10, a second handle 20, a rotating locking set 30, a fastening set 40 and a spring 50. The rotating locking set 30 is disposed between the first handle 10 and the second handle 20 through the fastening set 40. The spring 50 is disposed in the second handle 20 and elastically abuts against the rotating locking set 30. The first handle 10 and the second handle 20 may rotate relative to each other and are positioned through the rotating locking set 30, so as to change the angle of the first handle 10 with respect to the second handle 20.

The first handle 10 includes a first body 11 and a first accommodating slot 12, and the first body 11 includes a first slanted plane 13 disposed on one end. Additionally, the second handle 20 is movably combined with the first handle 10. The second handle 20 includes a second body 21 and a second accommodating slot 22, and the second body 21 includes a second slanted plane 23 attached to the first slanted plane 13 correspondingly and disposed on one end.

Specifically, the first slanted plane 13 and the second slanted plane 23 are respectively of an elliptical shape.

In this embodiment, the first handle 10 includes a lock cover 14 disposed on the opposite side of the first slanted plane 13. Furthermore, the second handle 20 includes a tool head 24 disposed on the opposite side of the second slanted plane 23.

The rotating locking set 30 includes a rotating block 31 and a locking block 32. The rotating block 31 is arranged in the first accommodating slot 12. The locking block 32 is arranged in the second accommodating slot 22, and one end of the rotating block 31 may be inserted to the locking block 32 to be selectively engaged with the locking block 32.

It should be noted that the total length of the first accommodating slot 12 and the second accommodating slot 22 is greater than the length of the stud 41. Accordingly, the first handle 10 or the second handle 20 may relatively move along an extension direction of the stud 41.

Specifically, the rotating block 31 includes a plurality of positioning ribs 311 and a hooking rib 312 disposed on the outer periphery. Moreover, the locking block 32 includes a plurality of locking ribs 321 disposed on the outer periphery and a plurality of locking grooves 322 disposed on the inner wall surface. Additionally, the first accommodating slot 12 includes a plurality of positioning grooves 121 corresponding to the plurality of positioning ribs 311 and disposed on the inner wall. The rotating block 31 is positioned in the first accommodating groove 12 through the positioning ribs 311 inserting to the positioning grooves 121.

Furthermore, the second accommodating slot 22 includes a plurality of locking grooves 221 corresponding to the plurality of locking ribs 321 and disposed on the inner wall. The locking block 32 is positioned in the second accommodating groove 22 through the locking ribs 321 inserting to the locking grooves 221.

Moreover, the fastening set 40 includes a stud 41 and a nut 42. The stud 41 passes through the locking block 32 and the rotating block 31. One end of the stud 41 is fixed in the first accommodating slot 12 and the other end is fastened with the nut 42 and inserted in the second accommodating slot 22.

In this embodiment, the stud 41 includes a bolt head 411 and a thread section 412. The bolt head 411 is positioned on the locking block 32, and the thread section 412 is combined with the nut 42.

The fastening set 40 further includes a first latch 43. Additionally, the first body 11 includes a first hole 110 communicating with the first accommodating slot 12. The first latch 43 is inserted in the first hole 110 to abut against the rotating block 31. In some embodiments, the rotating block 31 includes a rotation hole 310, and the first latch 43 is inserted in the rotation hole 310. The first latch 43 is inserted in the latching hole 310 to position the rotating block 31 in the first accommodating slot 12.

On the other hand, the fastening set 40 further includes a second latch 44. The second body 21 includes a second hole 220 communicating with the second accommodating slot 22. The second latch 44 is inserted in the second hole 220 to abut against the locking block 32. The locking block 32 includes a latching hole 320. The first latch 43 is inserted in the latching hole 320 to position the locking block 32 in the second accommodating slot 22.

It should be noted that the first latch 43 and the second latch 44 may be screws or nails, but they are not limited in the actual implementation.

Moreover, the spring 50 is mounted around the stud 41 and elastically abuts against the rotating block 31. When the first handle 10 and the second handle 20 move relatively to each other, the spring 50 may be stretched or compressed with respect to the movement of the first handle 10. In this embodiment, the rotating block 31 and the locking block 32 are engaged with each other when the spring 50 is compressed and disengaged from each other when the spring 50 is stretched.

Figure 4:
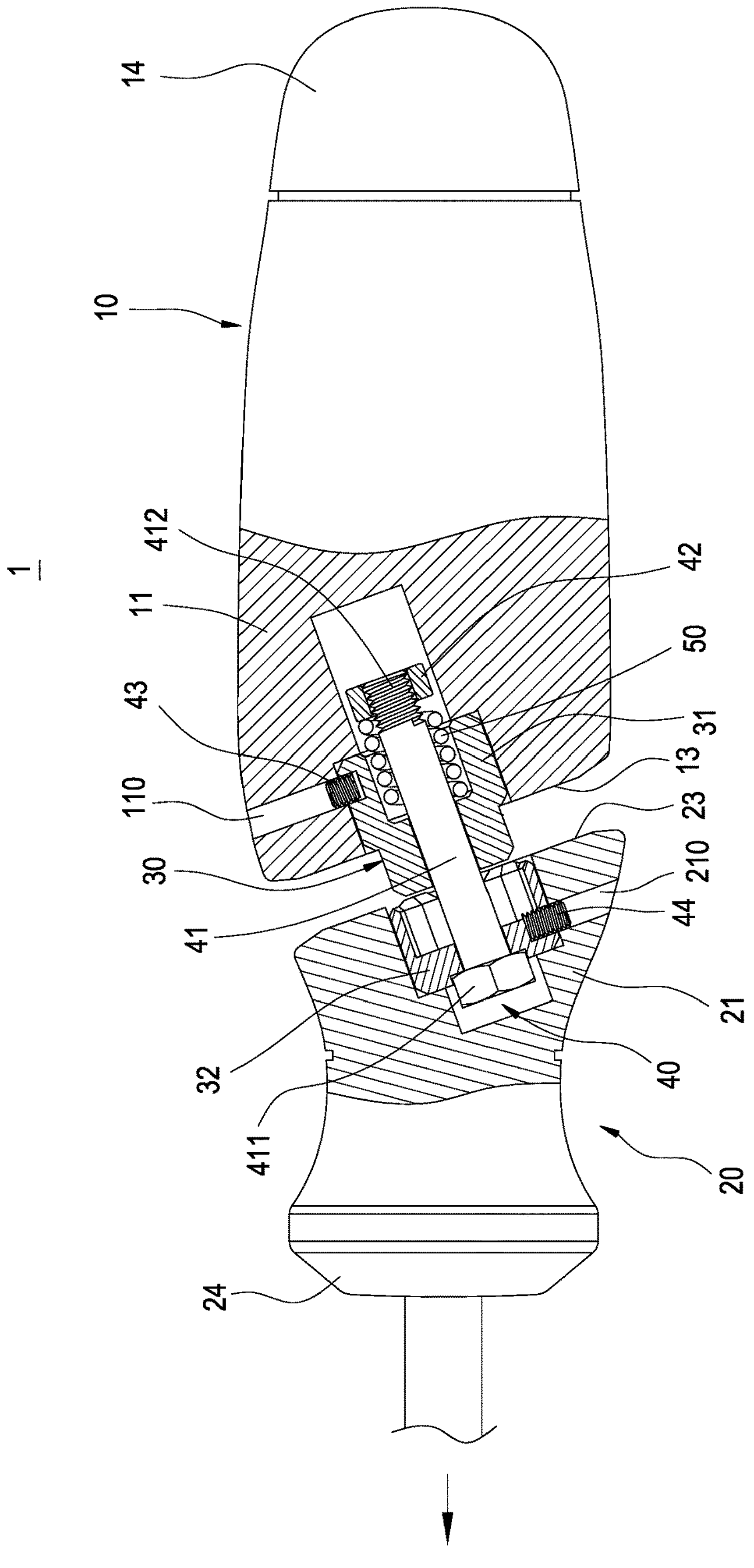
FIG. 4 and FIG. 5 are operation schematic views of rotation of the hand tool in this disclosure.
Figure 5:
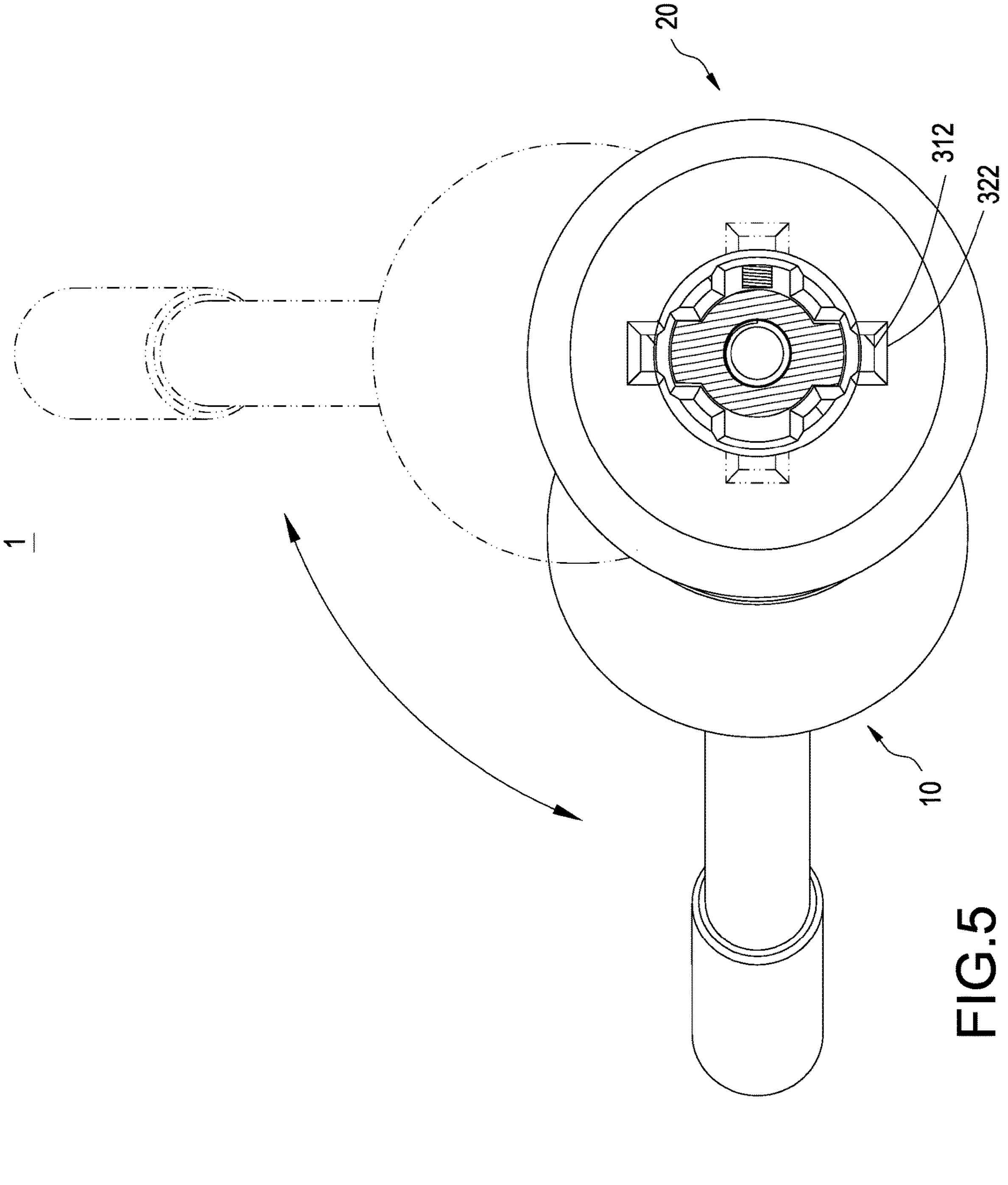

Please further refer to FIG. 4 and FIG. 5, which depict operation schematic views of rotation of the hand tool in this disclosure. As shown in FIG. 4, the first handle 10 or the second handle 20 may move relatively to each other when being pulled by an external force. The first handle 10 may drive the rotating block 31 to disengage from the locking block 32 in the moving process.

Please refer to FIG. 5, when the rotating block 31 is disengaged from the locking block 32, the first handle 10 and the rotating block 31 rotate with respect to the second handle 20 by the stud 41 as the center point to a specific angle, and then, a force is applied to the second handle 20 to make the second slanted plane 23 of the second handle 20 to abut against the first slanted plane 13 of the first handle 10. Accordingly, the hooking rib 312 of the rotating block 31 is inserted in one of the locking grooves 322. Therefore, the rotating block 31 and the locking block 32 are engaged with each other.

Figure 6:
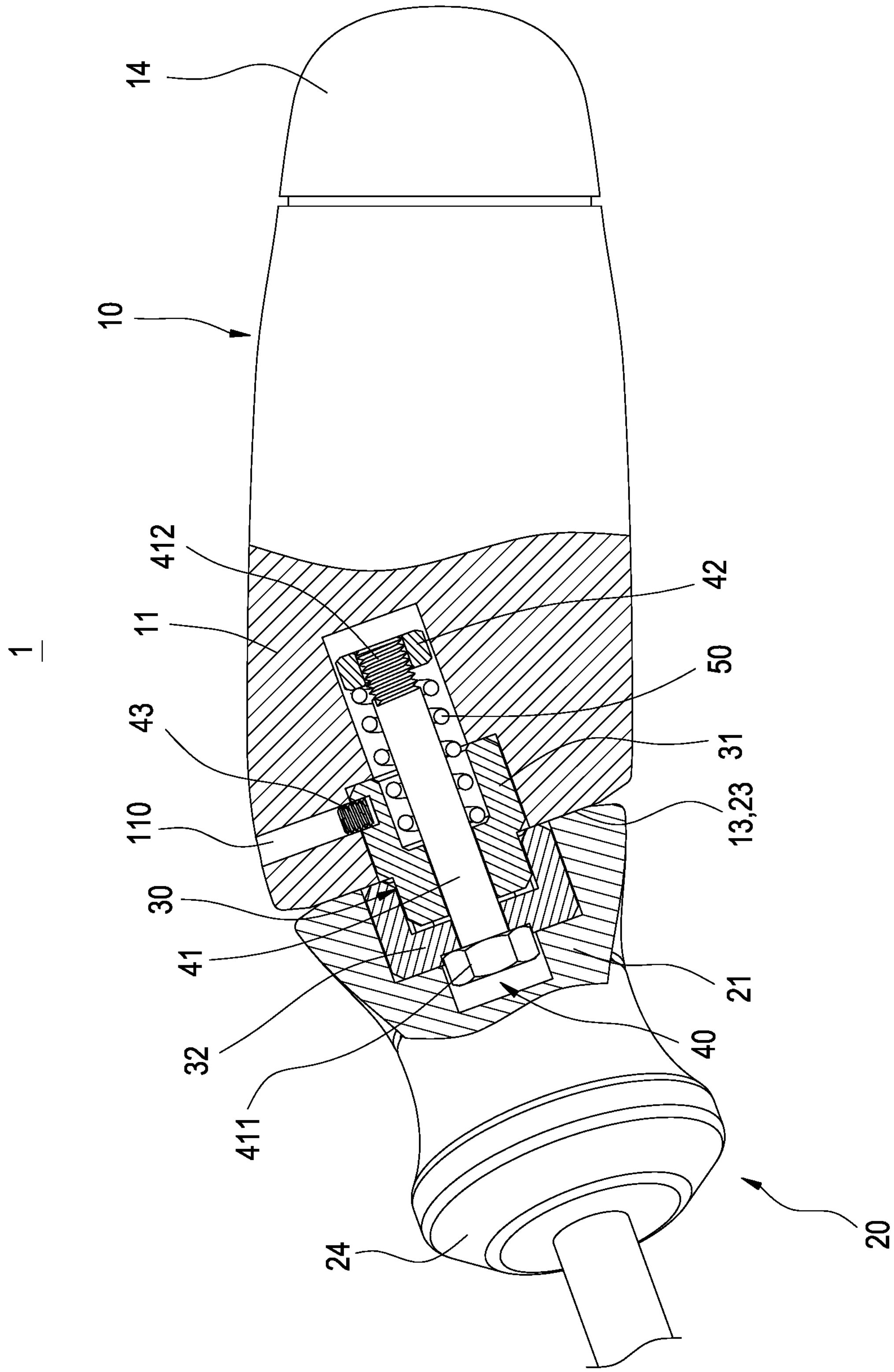
FIG. 6 is a cross sectional view of the hand tool after rotation in this disclosure.
Figure 7:
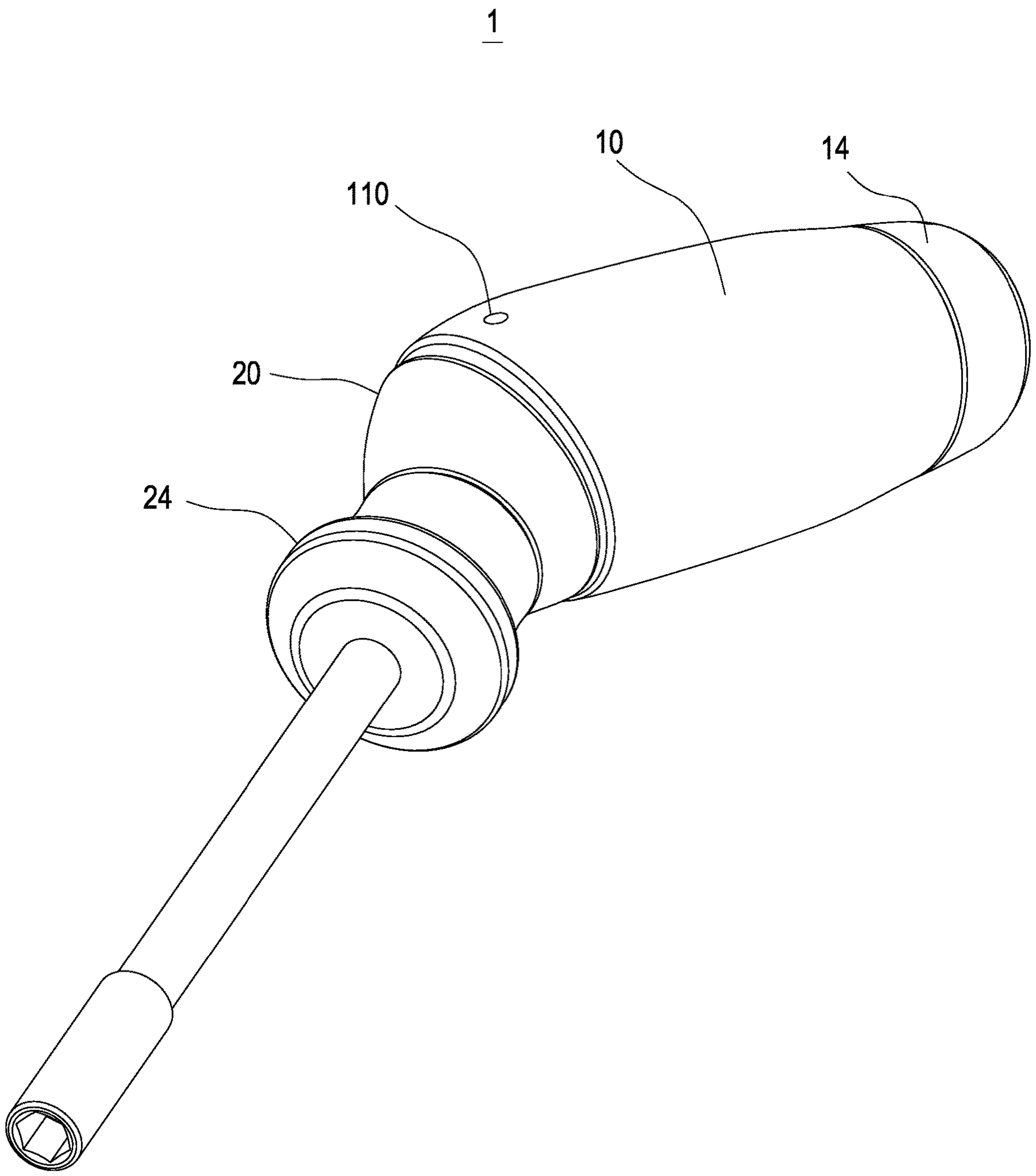
FIG. 7 is a perspective schematic view of the hand tool after rotation in this disclosure.

Please refer to FIG. 6 and FIG. 7, which depict a cross sectional view and a perspective schematic view after rotation in this disclosure. As shown in figures, after the first handle 10 and the second handle 20 of this disclosure rotating to a specific angle (such as 90 degrees), the rotating block 31 is engaged with the locking block 32 at the specific angle, so that the first handle 10 and the second handle 20 are positioned at the specific angle. Therefore, the tool head 24 may rotate with the second handle 20 to facilitate the operation.

While this disclosure has been described by means of specific embodiments, numerous modifications and variations could be made thereto by those skilled in the art without departing from the scope and spirit of this disclosure set forth in the claims.

What is claimed is:

1. A hand tool, comprising:

a first handle, comprising a first body and a first accommodating slot, the first body comprising a first slanted plane disposed on one end thereof;

a second handle, movably combined with the first handle, and comprising a second body and a second accommodating slot, the second body comprising a second slanted plane attached to the first slanted plane correspondingly and disposed on one end thereof;

a rotating locking set, comprising a rotating block and a locking block, wherein the rotating block is arranged in the first accommodating slot, and the locking block is arranged in the second accommodating slot;

a fastening set, comprising a stud and a nut, the stud passing through the locking block and the rotating block, wherein one end of the stud is fixed in the first accommodating slot and another end of the stud is fastened with the nut and inserted in the second accommodating slot; and a spring, mounted around the stud and elastically abutting against the rotating block;

wherein the locking block and the rotating block are engaged with each other when the spring is compressed and disengaged from each other when the spring is stretched, and the first handle or the second handle is configured to drive the rotating block to disengage from the locking block when being pulled by an external force; and the first handle and the rotating block are configured to rotate with respect to the second handle by the stud as a center point to make the rotating block and the locking block be engaged with each other after rotating a specific angle to position the first handle and the second handle.

2. The hand tool according to claim 1, wherein the first slanted plane and the second slanted plane are respectively of an elliptical shape.

3. The hand tool according to claim 1, wherein the locking block comprises a plurality of locking ribs disposed on an outer periphery thereof and a plurality of locking grooves disposed on an inner wall surface thereof; and the rotating block comprises a plurality of positioning ribs and a hooking rib disposed on an outer periphery thereof.

4. The hand tool according to claim 3, wherein a plurality of positioning grooves is disposed on an inner wall of the first accommodating slot corresponding to the plurality of positioning ribs; and a plurality of locking grooves is disposed on an inner wall of the second accommodating slot corresponding to the plurality of locking ribs.

5. The hand tool according to claim 1, wherein the stud comprises a bolt head and a thread section; and the bolt head is positioned on the locking block, and the thread section is combined with the nut.

6. The hand tool according to claim 1, wherein the fastening set further comprises a first latch; and the first body comprises a first hole communicating with the first accommodating slot and disposed on one side thereof, and the first latch is inserted in the first hole to abut against the rotating block.

7. The hand tool according to claim 6, wherein the rotating block comprises a rotation hole, and the first latch is inserted in the rotation hole.

8. The hand tool according to claim 1, wherein the fastening set further comprises a second latch; and the second body comprises a second hole communicating with the second accommodating slot and disposed on one side thereof, and the second latch is inserted in the second hole to abut against the locking block.

9. The hand tool according to claim 8, wherein the locking block comprises a latching hole, and the first latch is inserted in the latching hole.

10. The hand tool according to claim 1, wherein a total length of the first accommodating slot and the second accommodating slot is greater than a length of the stud, and the first handle or the second handle is relatively moved along an extension direction of the stud.

* * * * *